July 1, 1969   KATSUMI TAKAMI ET AL   3,453,434
INFRARED RAY DETECTOR UTILIZING FERROELECTRIC SINGLE CRYSTAL
Filed Oct. 22, 1968

Katsumi Takami,
Yoshido Yamada,
Kyo Suda and
Masashi Koga,
INVENTORS,

BY
Their Attorney.

United States Patent Office 3,453,434
Patented July 1, 1969

3,453,434
INFRARED RAY DETECTOR UTILIZING FERRO-ELECTRIC SINGLE CRYSTAL
Katsumi Takami, Yahiko Yamada, Kyo Suda, and Masashi Koga, Tokyo-to, Japan, assignors to Kabushiki Kaisha Hitachi Seisakusho, Tokyo-to, Japan
Continuation-in-part of application Ser. No. 648,492, June 23, 1967. This application Oct. 22, 1968, Ser. No. 769,483
Int. Cl. G01t 1/16
U.S. Cl. 250—83.3    3 Claims

ABSTRACT OF THE DISCLOSURE

An infrared ray detector constructed by a ferroelectric single crystal, means to irradiate infrared rays to the crystal, means to project visible light beam to the crystal, and means to photoelectrically detect the variations in quantity of the visible light penetrated through the ferroelectric single crystal.

*Cross-reference to related application*

This application is a continuation-in-part of our copending application Ser. No. 648,492, filed June 23, 1967, now abandoned, entitled, "Method and Apparatus for Detecting Infrared Rays."

*Background of the invention*

This invention relates to an apparatus for detecting infrared rays, in which ferroelectric substances are used.

More particularly, the invention relates to a new and improved apparatus for detecting infrared rays, in which the characteristic of abrupt variation in the index of refraction in the vicinity of the Curie point of a ferroelectric substance, when its temperature is varied, is utilized.

In an infrared ray thermal detector of known type, in which a ferroelectric substance is utilized, intensity of the infrared rays is measured on the basis of pyroelectric current to be generated by, or electrostatic capacitance to be varied by slight increase in the temperature of a ferroelectric element constituting the sensing element through the incident energy of the infrared rays to be detected.

Since, an infrared ray thermal detector of this character is of a type in which energy is absorbed, there is no wavelength dependency in the sensitivity with respect to the incident infrared rays, and, while the detector has a flat spectral response over the entire range of applicable wavelengths, its sensitivity has heretofore been extremely low.

In a photoelectric detector, on the other hand, the sensitivity differs greatly depending on the wavelength of the incident infrared rays. That is, while the sensitivity ordinarily drops remarkably with increasing wavelength of above 3 or 4 microns, the sensitivity with respect to light rays of short wavelength of 3 or 4 microns or less is higher by from 3 to 4 digits than that of the aforementioned thermal detector.

Accordingly, the conventional practice has been to use a thermal detector for detecting radiation rays of long wavelengths (infrared rays) emitted from objects at low temperatures (in the range of from room temperature to approximately 300 degrees C.) and to use a photoelectric detector for detecting radiation rays of short wavelengths emitted from objects at temperatures which are higher than said low temperatures.

Ferroelectric substance such as barium titanate possesses characteristics such that its refractive index abruptly changes with slight variations in temperature in the vicinity of the Curie point thereof. When a visible light beam is caused to penetrate through such ferroelectric substance, the path for the light beam before and after the temperature change in the ferroelectric substance is greatly varied.

Considering the temperature rise in the ferroelectric substance due to incident infrared rays thereinto, it becomes possible to detect infrared rays by photoelectrically detecting the variations in the visible light beam accompanying variations in the refractive index.

It is therefore an object of the present invention to provide an improved technique of detecting infrared rays, wherein the abrupt change in the refractive index of the ferroelectric substance due to its temperature change in the vicinity of the Curie point thereof. More specifically, it is an object of the invention to provide an apparatus for detecting infrared rays, in which the refraction-temperature characteristic of a ferroelectric crystal such as that of barium titanate, when it is subjected to temperature change is utilized.

It is another object of the present invention to provide an apparatus for photoelectrically detecting infrared rays, having no wavelength dependency. That is, the apparatus of the present invention possesses both advantages in the conventional thermal type infrared rays detector utilizing the above-mentioned refraction-temperature characteristics, and the conventional photoelectric type infrared rays detector, and thereby makes it possible to detect infrared rays with high sensitivity and without wavelength dependency. More concretely, the above-mentioned ferroelectric crystal is heated and maintained at a temperature at which the refractive index changes rapidly with temperature change, and the abrupt change in the refractive index occurring at the time of the ferroelectric crystal being irradiated by infrared rays to be detected is detected from the variation in the refractive index with respect to a visible light beam previously introduced into the ferroelectric crystal.

A further object of the invention is to provide an apparatus of the above stated character which entail relatively simple construction and operation and afford several highly desirable features as set forth hereinafter.

The nature, principle, and details of the invention, as well as the utility thereof, will be more clearly apparent from the following detailed description with respect to preferred embodiments of the invention when read in conjunction with the accompanying drawings, in which like parts are designated by like reference numerals.

Figure 1:
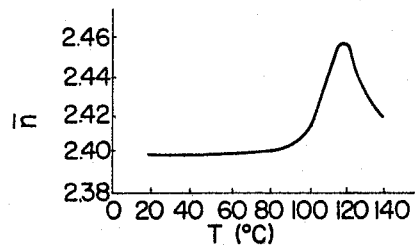
FIG. 1 is a graphical representation indicating the variation of refractive index with temperature of barium titanate.

FIG. 1 represents a characteristic curve showing variations in the refractive index $n$ of barium titanate single crystal due to temperature change, from which it will be clear that the refractive index $n$ of the ferroelectric substance abruptly changes in the vicinity of its Curie point (120 degrees C.). Furthermore, FIG. 2 indicates the difference $\Delta n$ between the refractive index $n_a$ in the $a$-axis direction and the refractive index $n_c$ in the $c$-axis direction of barium titanate single crystal, from which it is observed that the difference $\Delta n$ possesses abrupt changing characteristics with respect to temperature change.

Figure 3:
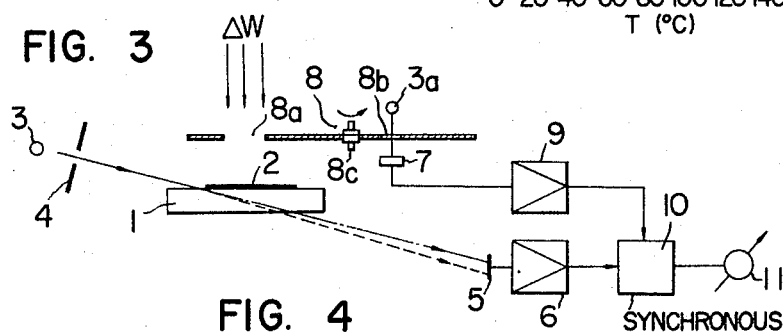
FIG. 3 is a schematic diagram indicating an example of the apparatus for detecting infrared rays embodying the invention.

These phenomena may be utilized in a thermal detector in accordance with the present invention in the form of the example illustrated in FIG. 3. In this example of embodiment of the invention, a ferroelectric single crystal 1 is heated and maintained at a temperature in the neighborhood of its Curie point (for example, 110 degrees C.). The crystal 1 is provided beforehand on its surface to receive infrared rays with means such as, for example, a blackening layer 2.

Visible light from a light source 3 passes through a slit 4 to be formed into a light beam, which is so directed as to penetrate diagonally through the interior of the crystal 1. The light beam thus transmitted is intercepted by a photoelectric detector 5 of high sensitivity in the visible light wavelength region as, for example, a detector of CdS or PbS, and resulting electrical signal is amplified by an amplifier 6. The signal thus amplified is transmitted to a synchronous rectifier circuit 10.

On one hand, there is provided a synchronous sector 8 for chopping the irradiation of the blackening layer 2 by infrared rays to be measured. The sector 8 is adapted to rotate about a shaft 8c and has apertures 8a for accomplishing the chopping of irradiation by the infrared rays and further apertures 8b. A light source 3a is disposed to direct light through the apertures 8b of the sector 8 to a phototransistor 7 for receiving this light and detecting the rotational velocity of the sector 8 as a function of this light. The resulting photoelectric current from the phototransistor is amplified by an amplifier 9 and sent to the synchronous rectifier circuit 10.

The synchronous rectifier circuit 10 operates to detect the respective phases of the output of the amplifier 9 corresponding to the rotational velocity of the sector 8 (and constituting a reference voltage) and the above mentioned signal from the photoelectric detector 5. The resulting output of the circuit 10 is sent to an indicator instrument 11.

The apparatus of the above described organization operates in the following manner. When the energy $\Delta W$ of the incident infrared rays to be detected is subjected to chopping by the sector 8 to cause the temperature of the ferroelectric single crystal 1 to fluctuate in correspondence with the quantity of the incident infrared energy in the neighborhood of the Curie point of the crystal 1, the refractive index $n$ of the single crystal 1 slightly fluctuates. Accordingly, the rate of temperature rise of the crystal 1 (and, consequently, the variation in the diffractive index) corresponds to the rotational velocity of the synchronous sector 8. Consequently, the light beam passed through the slit 4 takes a light path refracted as indicated by dotted line in correspondence with the variation in the refractive index of the ferroelectric crystal 1, whereby the quantity of the incident light with respect to the photoelectric detector 5 varies. Moreover, since this light beam is visible light beam, it causes almost no rise in the temperature of the ferroelectric crystal. Even if there takes place some heating and consequent rise in temperature of the crystal since this heating will be steady, it can be distinguished from the periodical heating of the infrared rays.

When there is a particular need to magnify the variation of the light quantity of the incident visible light beam, a lens is placed behind the slit 4 to form an image on the photoelectric detector 5, whereby, when the refractive index $n$ of the ferroelectric crystal 1 changes this image becomes blurred and the variation of the incident light quantity is magnified. If the light receiving surface of the photoelectric detector 5 is orientated with an inclination relative to the path (as indicated by a solid line) of the visible light beam, the quantity of incident light received will be reduced, since the incidence angle of the light to the photoelectric detector 5 will vary in accordance with the variation of the refractive index $n$ of the ferroelectric single crystal 1.

Figure 4:
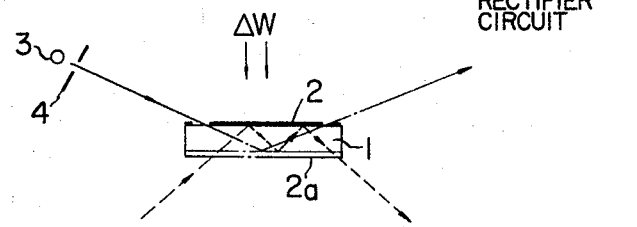
FIGS. 4, 5, and 6 are schematic diagrams respectively showing other examples of embodiment of the invention.

In another embodiment of the invention as illustrated in FIG. 4, a mirror surface 2a is provided on the reverse surface of a ferroelectric single crystal 1. A light beam produced by a light source 3 and passed through a slit 4 is once reflected by this mirror surface (of course, the mirror surface also reflects the infrared rays which have penetrated through the blackening layer 2 and further penetrated through the crystal 1, thereby serving for temperature rise in the crystal 1). The visible light beam which has once been reflected then passes close by the blackening layer 2 at high temperature and is projected toward a photoelectric detector 5 (not shown in FIG. 4).

In order to obtain a higher sensitivity, it is preferable to adopt the multiple reflection method as shown by dotted line in FIG. 4.

Figure 5:
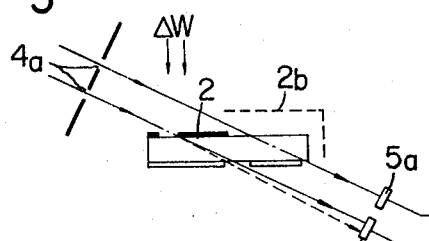

In still another embodiment of the invention as illustrated in FIG. 5, one surface of a ferroelectric single crystal of barium titanate of 100 microns thick and 7–8 mm. long is provided on one part thereof with a blackening layer 2, the other part thereof being provided with an infrared shield 2b to shield this part from incidence of infrared ray energy thereby constituting a compensation element. Two visible light beams from a double slit 4a are directed to the crystal, one beam being passed through the detector part, and the other beam being passed through the compensation element. The two light beams thus passed through the crystal are respectively received by photoelectric detectors 5 and 5a which are apart from this compensation element by about 20 cm. with their output sides connected to a differential amplifier 6a, whereby the difference between the quantities of incident light of the two beams is measured.

Figure 6:
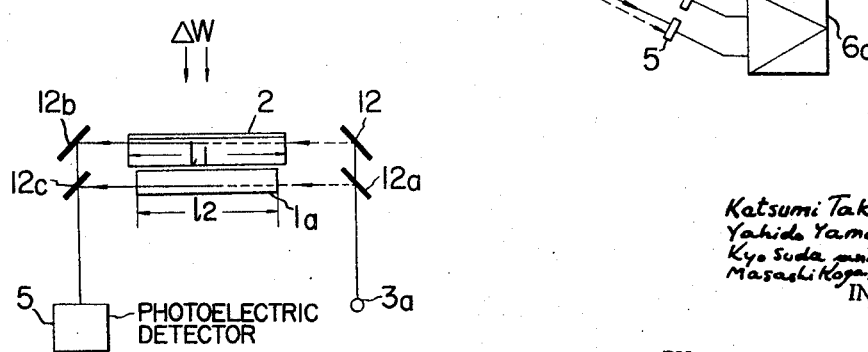

Furthermore, by using interference, it is possible to detect with even higher sensitivity variations in the refractive index of the single crystal. One example of thus using interference in accordance with the invention is illustrated in FIG. 6. As shown, two ferroelectric single crystals 1 and 1a of approximately the same size are disposed in parallel arrangement, and of these two crystals only one crystal 1 is adapted to receive infrared rays.

A light source 3a is provided to supply monochromatic light of a wavelength $\lambda$ within the wavelength range of visible light. The monochromatic light beam is caused by a group of reflection mirrors 12, 12a, 12b and 12c to pass through both ferroelectric crystals 1 and 1a and to be directed to a photoelectric detector 5, which operates to detect the interference pattern of the beam.

When this apparatus is so designed that interference occurs when $m$ assumes a value represented by $$m = \frac{n(l_1 - l_2)}{\lambda}$$

where: $l_1$ and $l_2$ are respectively lengths of single crystals 1 and 1a, and $n$ is the refractive index of the single crystal, the photoelectric detector 5 detects interference lag with high sensitivity when the diffractive index $n$ undergoes a minute variation of $\Delta n$. That is, it becomes possible to detect the quantity of infrared rays received in the form of interference of visible light.

Figure 2:
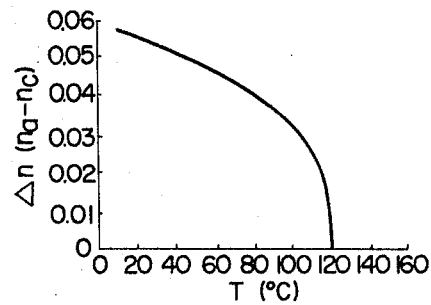
FIG. 2 is a graphical representation indicating the variation with temperature of the difference in refractive indexes in the $a$-axis direction and the $c$-axis direction of barium titanate.

While the foregoing description related to apparatuses wherein variation of the refractive index of an axis in one direction of a ferroelectric material is utilized, the difference between the variations of refractive indexes in the $a$ and $c$-axes as indicated in FIG. 2 may be detected (a method as indicated in FIG. 4 being adopted to measure this difference). In this case, it is not always necessary to maintain the crystal at a temperature in the neighborhood of its Curie point.

The single crystal to be used in accordance with the invention is not only not limited to barium titanate, but also other ferroelectric single crystals having transparency in the visible light region such as that of triglycine sulfate are also suitable.

As described above, the present invention provides an infrared ray detector in which a ferroelectric crystal is utilized. We have found that the infrared ray detector according to the invention has the following principal features.

(1) Since the ferroelectric crystal at a temperature in the vicinity of its Curie point is utilized to absorb infrared ray energy and undergo variations in its refractive index, the detector is a pure thermal detector and possesses a flat spectral response which is not dependent on wavelength. Therefore, the detector is capable of detecting radiation even from low-temperature objects.

(2) Since the variations in the refractive index of the ferroelectric single crystal are detected with visible light and, moreover, by means of a photoelectric detector of extremely high sensitivity in the wavelength range of the visible light, even minute variations in the refractive index can be detected with high sensitivity.

(3) Since the detector does not directly detect an electrical signal for itself, there is no necessity of connecting lead wires. Therefore, loss of heat by conduction from lead wires can be made zero, and the sensitivity is thereby increased.

(4) By once reflecting the light beam at the reverse surface of the crystal as indicated in FIG. 4, the light beam is caused to pass twice through the part of the crystal of great variation in refractive index, whereby the sensitivity is doubled.

(5) By incorporating a differential technique as indicated in FIG. 5, the influence of ambient temperature can be nullified, and, moreover, only the differential component is amplified. Therefore, a high sensitivity is attained.

(6) The limit of minimum detectable energy in the case of a thermal detector of generally known type has been determined by the thermal noise (Johnson noise) of the resistance of the detector itself, and it has not been possible heretofore to detect and measure infrared ray energy below this noise level. By the practice of the present invention, however, since signals are not detected electrically, the Johnson noise of the detector does not become a problem. The only problem which may possibly arise is that of thermally originating fluctuation of the refractive index within the crystal, but this is small in comparison with the Johnson noise. Furthermore, since the intensity of the light beam can be selected at will to be of any high value, the Johnson noise of the photoelectric detector 5 can be completely neglected.

We claim:

1. An infrared ray detector comprising: a ferroelectric single crystal having transparency within the region of visible light wavelength; means to project periodically onto the ferroelectric single crystal an infrared ray to be detected; means to maintain the ferroelectric single crystal at a temperature in the vicinity of the Curie point thereof; means to project a visible light beam to the ferroelectric single crystals; and photoelectric means to detect the visible light beam penetrated through the ferroelectric single crystal.

2. An infrared ray detector as defined in claim 1, in which the ferroelectric single crystal is provided on one surface thereof with a receiving portion of infrared rays, and a nonreceiving portion thereof, and the visible light to be projected onto the ferroelectric single crystal is composed of two parallel beams, one being projected in the neighborhood of the infrared ray receiving portion and the other being projected on the nonreceiving portion, the two visible light beams being respectively intercepted by individual photoelectric means and the difference between the quantity of incident light beams being measured.

3. An infrared ray detector comprising: parallel disposed two ferroelectric single crystals of approximately the same dimension, each having transparency within the region of visible light wavelength; means, provided on one of the ferroelectric single crystals, to receive infrared rays to be detected; means to maintain the ferroelectric single crystals at a temperature in the vicinity of the Curie point thereof; means to divide a single visible light beam from a light source into two divided parallel light beams and transmitting the two light beams respectively through the two ferroelectric single crystals in the longitudinal direction thereof; means to gather the two parallel light beams thus transmitted again into a single light beam; photoelectric means to detect the interference pattern due to the difference between the paths of the two divided parallel light beams affected by irradiation of the infrared rays to be detected, the infrared rays being detected from variations in the interference pattern in the photoelectric means.

References Cited

UNITED STATES PATENTS 3,012,465 12/1961 Goldberg _____ 356—136
3,313,937 4/1967 Handi.
3,319,071 5/1967 Werth et al.

RALPH G. NILSON, Primary Examiner.

MORTON J. FROME, Assistant Examiner.

U.S. Cl. X.R.
73—355; 356—136